United States Patent
Yen et al.

(10) Patent No.: US 9,690,489 B2
(45) Date of Patent: Jun. 27, 2017

(54) METHOD FOR IMPROVING ACCESS PERFORMANCE OF A NON-VOLATILE STORAGE DEVICE

(71) Applicant: Storart Technology Co., Ltd., Hsinchu (TW)

(72) Inventors: Chih-Nan Yen, Hsinchu (TW); Chien-Cheng Lin, Hsinchu (TW); Szu-I Yeh, Hsinchu (TW)

(73) Assignee: Storart Technology Co. Ltd., Hsinchu (TW)

( * ) Notice: Subject to any disclaimer, the term of this patent is extended or adjusted under 35 U.S.C. 154(b) by 270 days.

(21) Appl. No.: 14/201,856

(22) Filed: Mar. 8, 2014

(65) Prior Publication Data
US 2015/0253990 A1    Sep. 10, 2015

(51) Int. Cl.
| G06F 13/00 | (2006.01) |
| G06F 3/06 | (2006.01) |
| G06F 12/02 | (2006.01) |
| G06F 12/06 | (2006.01) |

(52) U.S. Cl.
CPC ............ *G06F 3/061* (2013.01); *G06F 3/0656* (2013.01); *G06F 3/0679* (2013.01); *G06F 3/0623* (2013.01); *G06F 3/0647* (2013.01); *G06F 3/0676* (2013.01); *G06F 12/0215* (2013.01); *G06F 12/0253* (2013.01); *G06F 12/0623* (2013.01); *G06F 12/0676* (2013.01)

(58) Field of Classification Search
CPC ...... G06F 3/061; G06F 3/0656; G06F 3/0679; G06F 12/023; G06F 12/0676; G06F 2206/1014
USPC ........ 711/103, 152, 156, 220; 709/221, 229; 710/23, 34, 54, 310; 712/203, 226
See application file for complete search history.

(56) References Cited

U.S. PATENT DOCUMENTS

| 7,450,457 | B2 * | 11/2008 | Shiota | G06F 13/161 365/189.04 |
| 7,512,738 | B2 * | 3/2009 | Balakrishnan | G06F 9/4426 711/119 |
| 2010/0195393 | A1 * | 8/2010 | Eggleston | G06F 11/106 365/185.09 |
| 2011/0026391 | A1 * | 2/2011 | Takahashi | G11B 20/1217 369/275.3 |
| 2012/0260149 | A1 * | 10/2012 | Chang | G06F 11/1068 714/773 |
| 2012/0278530 | A1 * | 11/2012 | Ebsen | G06F 3/0659 711/103 |

(Continued)

*Primary Examiner* — Reba I Elmore
(74) *Attorney, Agent, or Firm* — Che-Yang Chen; Law Offices of Scott Warmuth (57) ABSTRACT

A method for improving access performance of a non-volatile storage device when programming data of a size smaller than a fixed minimum program number (FMPN) is disclosed. The method includes the steps of: predetermining a size of a blank data section for combining with a first data section and a second data section, the total size of the first data section, the second data section and the blank data section equals the FMPN; reading out data located at the second data section; updating a new data to the first data section; combining the new data with the data at the second data section; and incorporating the combined data with the blank data of the blank data section to become a final data, and programming the final data.

1 Claim, 7 Drawing Sheets

(56) References Cited

U.S. PATENT DOCUMENTS

| | | | |
|---|---|---|---|
| 2013/0176783 A1* | 7/2013 | Senoo | G11C 16/20 365/185.09 |
| 2013/0258778 A1* | 10/2013 | Oh | G11C 16/26 365/185.11 |
| 2014/0281164 A1* | 9/2014 | Nishiyama | G06F 12/0246 711/103 |
| 2015/0046666 A1* | 2/2015 | Lee | G06F 12/02 711/159 |
| 2015/0063034 A1* | 3/2015 | Tagawa | G11C 16/10 365/185.18 |

* cited by examiner

METHOD FOR IMPROVING ACCESS PERFORMANCE OF A NON-VOLATILE STORAGE DEVICE

FIELD OF THE INVENTION

The present invention relates to a method for improving access performance of a non-volatile storage device when programming data of a size smaller than a fixed minimum program number (FMPN).

BACKGROUND OF THE INVENTION

The access performance of data of a specific size may deteriorate while the fixed minimum program number (FMPN) increases. The FMPN is the minimum data size required for each programming process.

Figure 1A:
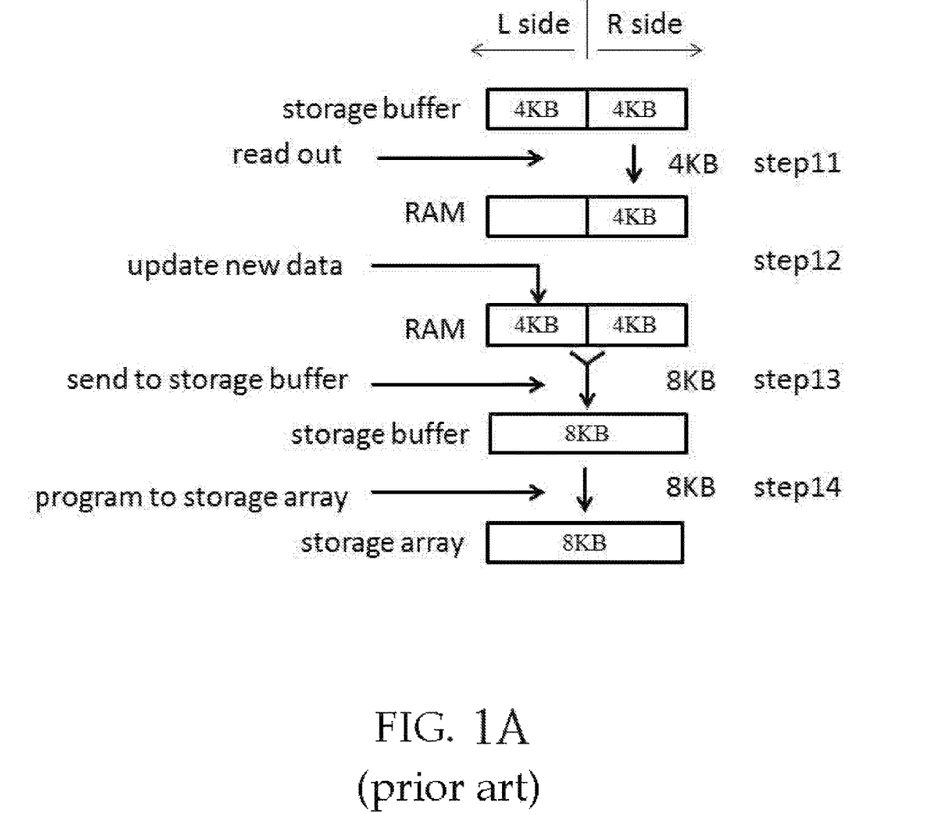
FIGS. 1A and 1B are respectively a schematic diagram and a flowchart of the conventional access method for a non-volatile memory having FMPN of 8 KB.

FIG. 1A is a schematic diagram of the conventional access method for a non-volatile memory having FMPN of 8 KB.

Please refer to FIG. 1A, FMPN is 8 KB and assume that the new data to be updated is 4 KB on L side.

Traditionally, if data of a size smaller than FMPN is to be updated or programmed, the data will be programmed together with another data so that the total data size of the combined data reaches FMPN. The combined data of a size that equals to FMPN conventionally includes two sections, whereas the present invention includes three sections which will be further described afterwards. The two sections are named R side (located at the right side of the combined data) and L side (located at the left side of the combined data) for illustration purpose only. Data that is to be updated or programmed is stored in the L side while data for complement use so that the total data size can reach EMPN is stored in the R side. Due to characteristic of non-volatile data storage device, the complement 4 KB data on R side must be read out since the data should be kept as valid, as shown in step 11. Then, the new 4 KB data is updated to L side of a random access memory (RAM), as shown in step 12. Next, the 8 KB combined data is sent from the RAM to a storage buffer, as shown in step 13. Finally, the 8 KB (FMPN) combined data is programmed from the storage buffer to an array, as shown in step 14. The total amount of data that has been transferred between the RAM and the storage medium is 4 KB (step 11)+8 KB (step 13)=12 KB.

Figure 1B:
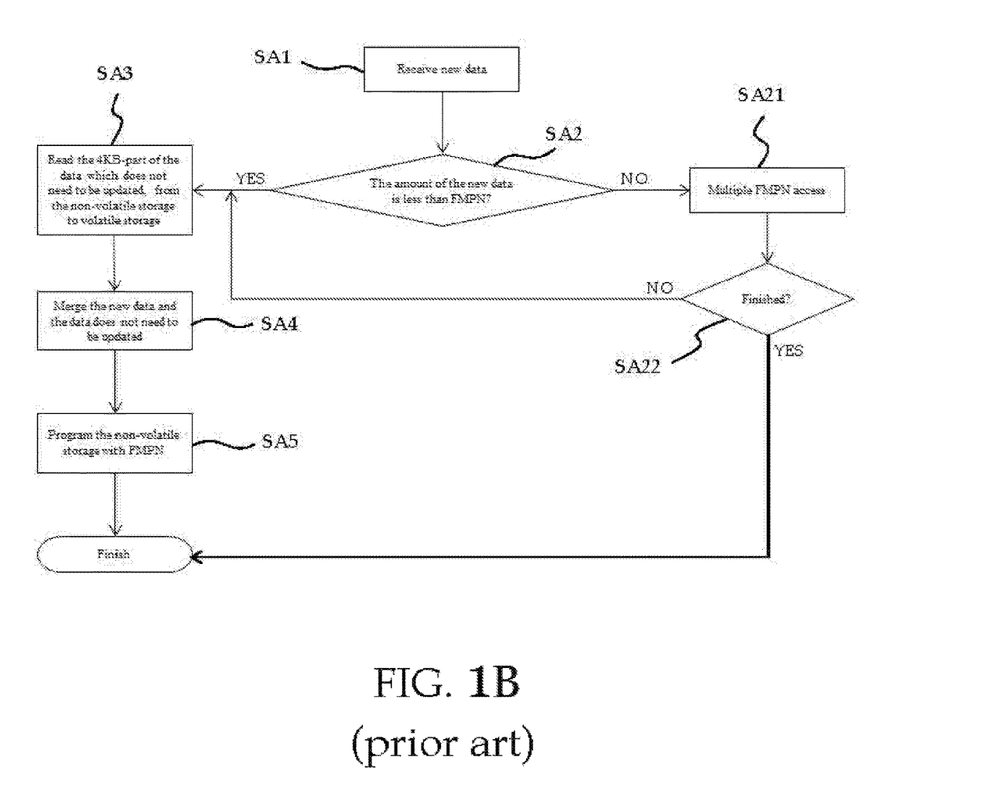

FIG. 1B is a flowchart of the conventional access method for the non-volatile memory having FMPN of 8 KB.

Please refer to FIG. 1B, the conventional access method for FMPN of 8 KB comprises the steps of:
  step SA1: receiving new data;
  step SA2: checking if the amount of the new data is less than FMPN; if, yes, running next step; if no, the new data is multiple FMPN access (step SA21), and then checking if finishing the step (step SA22); if no, running next step;
  step SA3: reading the 4 KB-part of the data which does not need to be updated from a non-volatile storage to a volatile storage;
  step SA4: merging the new data and the data that does not need to be updated; and
  step SA5: programming the non-volatile storage with FMPN.

Figure 2:
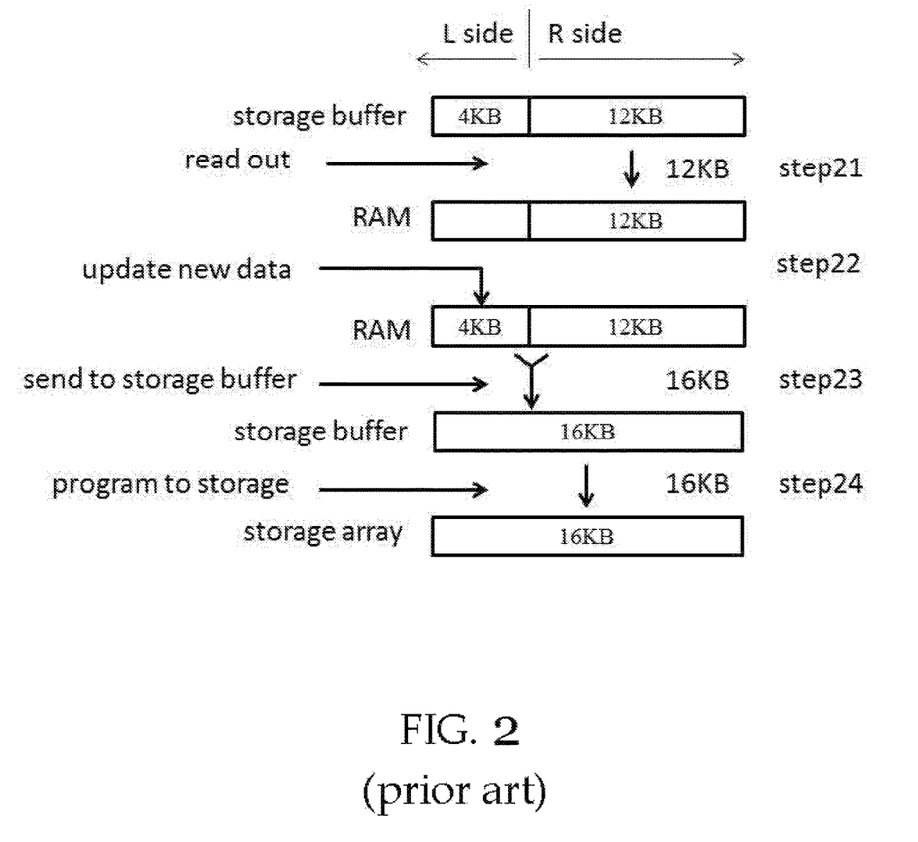
FIG. 2 is a schematic diagram of the conventional access method for a non-volatile memory having FMPN of 16 KB.

FIG. 2 is a schematic diagram of the conventional access method for a non-volatile memory having FMPN of 16 KB.

Please refer to FIG. 2, in this embodiment, FMPN is 16 KB and assume that the new data to be updated is 4 KB on the L side. The flowchart is the same as FIG. 1B, so the drawing is omitted.

Due to characteristic of non-volatile data storage device, the complement 12 KB data on the R side must be read out since the data should be kept as valid, as shown in step 21. Then, the new 4 KB data is updated to the L side of the RAM, as shown in step 22. Next, the 16 KB combined data is sent from the RAM to the storage buffer, as shown in step 23. Finally, the 16 KB (FMPN) combined data is programmed from the storage buffer to the array, as shown in step 24. The total amount of data that has been transferred between the RAM and the storage medium is 12 KB (step 21)+16 KB (step 23)=28 KB.

In comparison of 8 KB FMPN where the total amount of data transferred is 12 KB, the performance of 16 KB FMPN is lower.

SUMMARY OF THE INVENTION

Due to the characteristic of non-volatile data storage device, there is always a Fixed Minimum Program Number (FMPN) for the amount of the data to be programmed. The fixed minimum program number will be abbreviated as FMPN and frequently used in this invention. The amount of the data to be programmed must be multiple of FMPN.

In most case, the size of the new data to be updated may be lesser than FMPN. Data must still be programmed even if the size of new data is lesser than FMPN.

A method for improving access performance of a non-volatile storage device is provided and the steps of the method comprises:
  step SB1: dividing the FMPN to three parts as a L side, a M side and a dummy side disposed at a storage buffer, wherein the size of the L side, the M side, and the dummy side are L bytes, M bytes, and predetermined bytes respectively;
  step SB2: assuming the data to be updated is located at the L side, and a controller reading out the data which located at the M side to the storage buffer;
  step SB3: updating a new data whose length is L bytes to the L side of the storage buffer from the host;
  step SB4: combining the new data at the L side and the data at the M side to become a present data; and
  step SB5: combining the data of the L side, the M side and the dummy data located at the dummy side to become a final data, and programming the final data.

DESCRIPTION OF THE PREFERRED EMBODIMENT

Figure 3:
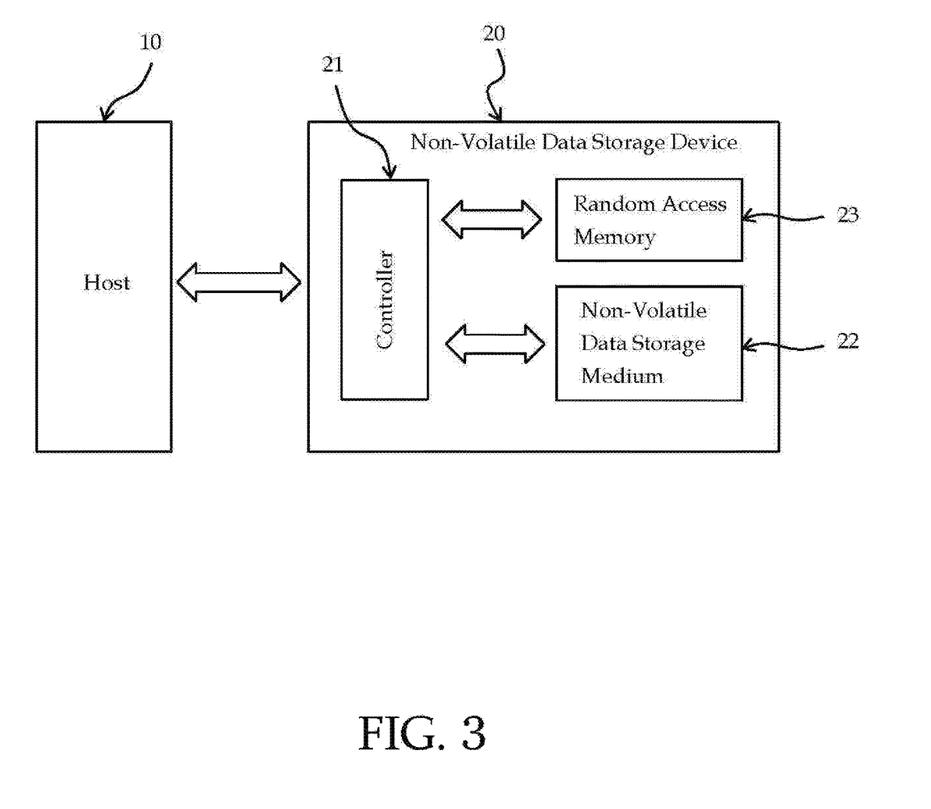
FIG. 3 is a block diagram of a non-volatile storage device according to the present invention.

FIG. 3 is a block diagram of a non-volatile storage device in accordance with this invention.

Please refer to FIG. 3, the non-volatile data storage device 20 is for storing data from a host 10. The non-volatile data storage device may be a memory card, but not limited thereto. Generally, the non-volatile data storage device 20 may comprise a controller 21, a non-volatile data storage medium 22 (such as flash memory), and a random access memory (RAM) 23.

The controller 21 is used as an interface between the host 10, the non-volatile data storage medium 22 and the random access memory 23. The non-volatile data storage medium 22 is for data storage and could be a hard disk, or a flash memory. The random access memory 23 is a volatile memory, which may store temporary data or information for controller operation. The access performance is referred as how much data should be transferred between the random access memory 23 and the storage medium 22 to complete an action.

Figure 6:
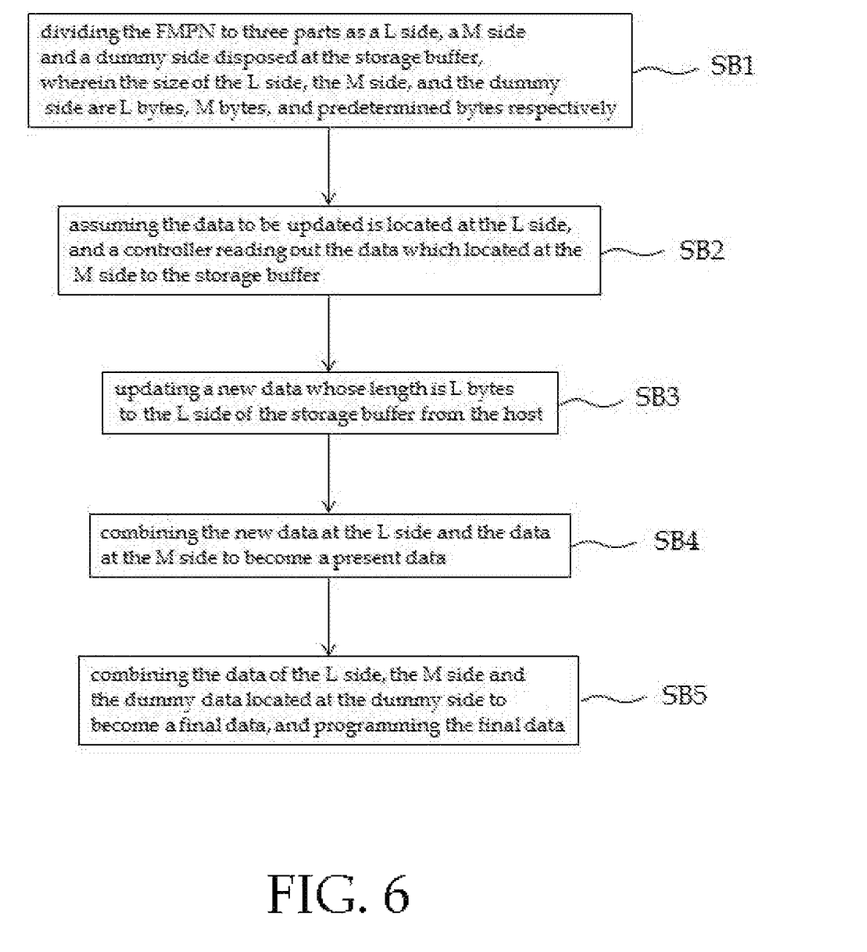
FIG. 6 is a flowchart of the method for improving access performance of a small portion of data on a large area in non-volatile storage device in accordance with this invention.

FIG. 6 is a flowchart of the method for improving access performance of a small portion of data on a large area in a non-volatile storage device in accordance with this invention.

Please refer to FIG. 6, the steps of the method for improving access performance of a small portion of data on a large area in a non-volatile storage device when programming data of a size smaller than a fixed minimum program number (FMPN) in accordance with this invention may comprise the following steps:

- step SB1: predetermining a size of a blank data section (i.e., dummy side) which is stored with blank data for combining with a first data section (i.e., L side) which stores data to be programmed and a second data section (i.e., M side) which is disposed between the first data section and the blank data section, the total size of the first data section, the second data section and the blank data section equals the FMPN;
- step SB2: reading out data located at the second data section of a non-volatile data storage medium 22 to a storage buffer 23 by a controller 21;
- step SB3: updating a new data to the first data section of the storage buffer 23 from the host 10;
- step SB4: combining the new data at the first data section with the data at the second data section in the storage buffer 23; and
- step SB5: incorporating the combined data in step SB4 with the blank data of the blank data section to become a final data, and programming the final data to an array.

Figure 4:
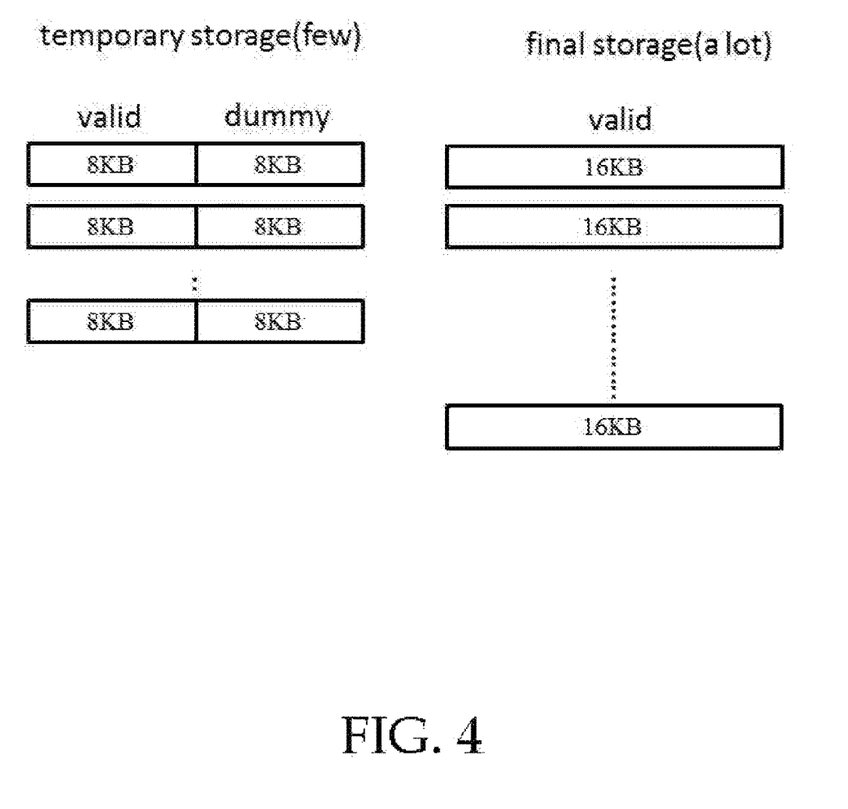
FIG. 4 is a schematic diagram of an operation method for data access on left side.

FIG. 4 is a schematic diagram of an access method for data access on the left side.

The storage device is shown as in FIG. 1. Please refer to FIG. 4, a little waste on storage capacity is acceptable since the storage size is nowadays huge due to the advanced storage process. Allocate several segments as temporary storage, which only part of the capacity is used, as shown on the left side of FIG. 4., in this embodiment, the FMPN is 16 KB, but only 8 KB is used to record valid data, where the "dummy" sections each of a size of 8 KB are blank data which are considered as "invalid data". Perform data access on them. When they are full or at a proper time, perform a merge procedure. The merge procedure means that 2 pieces of valid data are merged to reach FMPN and program to the final storage. Operating this merge procedure in the background can reduce the time needed for the merger.

Figure 5:
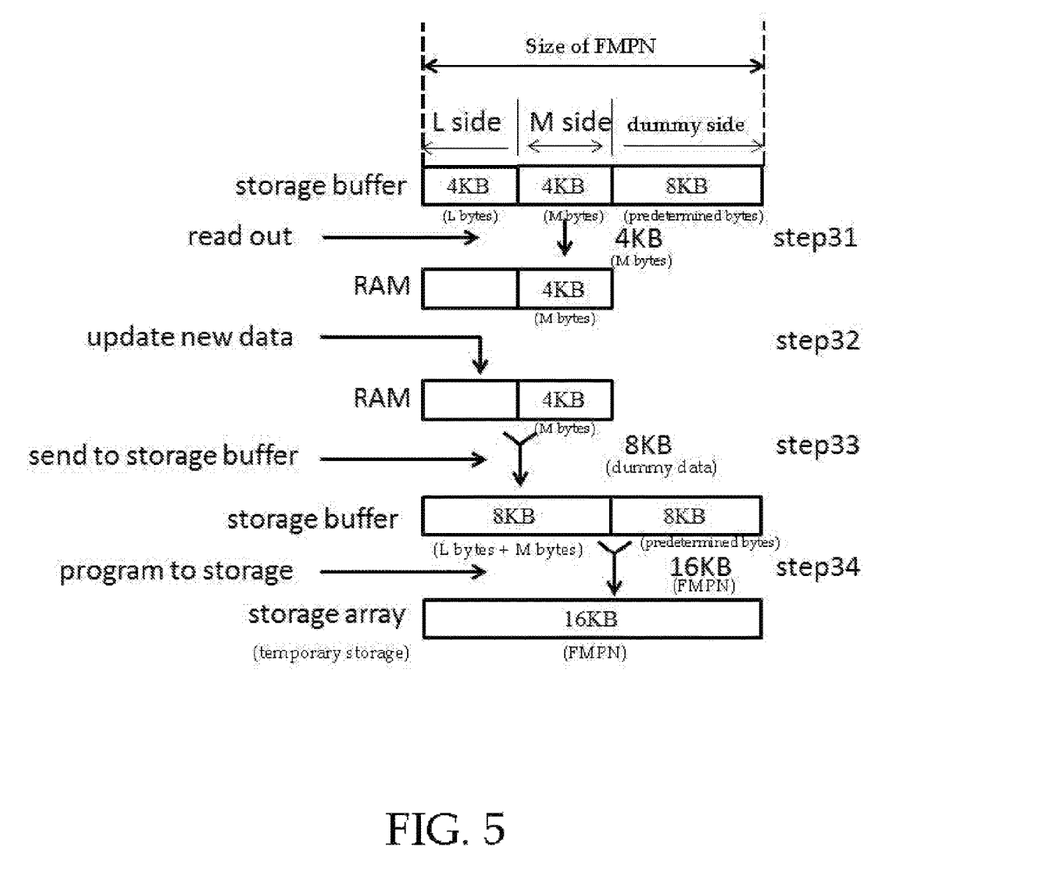
FIG. 5 is a schematic diagram of a method for improving access performance of a small portion of data on a large area in a non-volatile storage device in accordance with this invention.

FIG. 5 is a schematic diagram of a method for improving access performance of a non-volatile storage device when programming data of a size smaller than FMPN in accordance with this invention.

Please refer to FIG. 5, FMPN may be 16 KB and assumed that the new data to be updated is 4 KB on the L side.

The dummy 8 KB on the dummy side is a little waste to exchange for performance and will not be used anymore. Assume the data to be updated is located at the L-side. Due to characteristic of non-volatile data storage device, the 4 KB data of the M side must be read out since the data should be kept as valid, as shown in step 31. Then, the new 4 KB data is updated to the L side of the RAM, as shown in step 32. Next, the 8 KB (L side+M side) combined data is sent from the RAM to the storage buffer, as shown in step 33. Finally, the 16 KB (FMPN) incorporated data is programmed from the storage buffer to an array, as shown in step 34. The total amount of data that has been transferred between the RAM and the storage medium is 4 KB (step 31)+8 KB (step 33)=12 KB.

Comparing to the condition of 8 KB FMPN, the amount of transferred data is 12 KB, the access performance of the present invention for 16 KB FMPN is the same as that of 8 KB FMPN. Therefore, the access performance does not degrade as FMPN increases.

What is claimed is:

1. A method for storing a data of a size smaller than a fixed minimum program number (FMPN) to a non-volatile storage device, comprising the steps of:
    step SB1: predetermining a size of a blank data which contains invalid data, wherein the blank data has a size smaller than the FMPN;
    step SB2: providing a complement data which contains valid data and has a size which allows the data to be stored, the complement data and the blank data to have a total size that equals to the FMPN in a Random Access Memory (RAM) of the non-volatile storage device;
    step SB3: adding the data to be stored to the RAM;
    step SB4: combining the data to be stored with the complement data and transmit the combined data to a storage buffer of the non-volatile storage device; and
    step SB5: incorporating the combined data in step SB4 with the blank data to become a final data which has a size that equals to the FMPN; and
    step SB6: storing the final data to an array of the non-volatile storage device.

* * * * *